No. 755,681. Patented March 29, 1904.

UNITED STATES PATENT OFFICE.

TIMOTHY LONG, OF CLEVELAND, OHIO.

HOISTING AND CONVEYING APPARATUS.

SPECIFICATION forming part of Letters Patent No. 755,681, dated March 29, 1904.

Application filed November 17, 1902. Serial No. 131,634. (No model.)

*To all whom it may concern:*

Be it known that I, TIMOTHY LONG, a citizen of the United States of America, and a resident of Cleveland, in the county of Cuyahoga and State of Ohio, have invented certain new and useful Improvements in Hoisting and Conveying Apparatus, of which the following is a specification.

This invention relates to means for unloading and conveying ore or other material from the holds of vessels and depositing it into cars or other receptacles in a convenient and expeditious manner; and it consists of a trestle-framework supporting a traversing carriage upon which is provided a vertical hoisting device and a conveyer for receiving and depositing it in required receptacles.

The invention consists in the peculiar construction and combination of mechanisms adapted for carrying out the purposes stated, substantially as hereinafter described, and pointed out in the claims.

Figure 1:
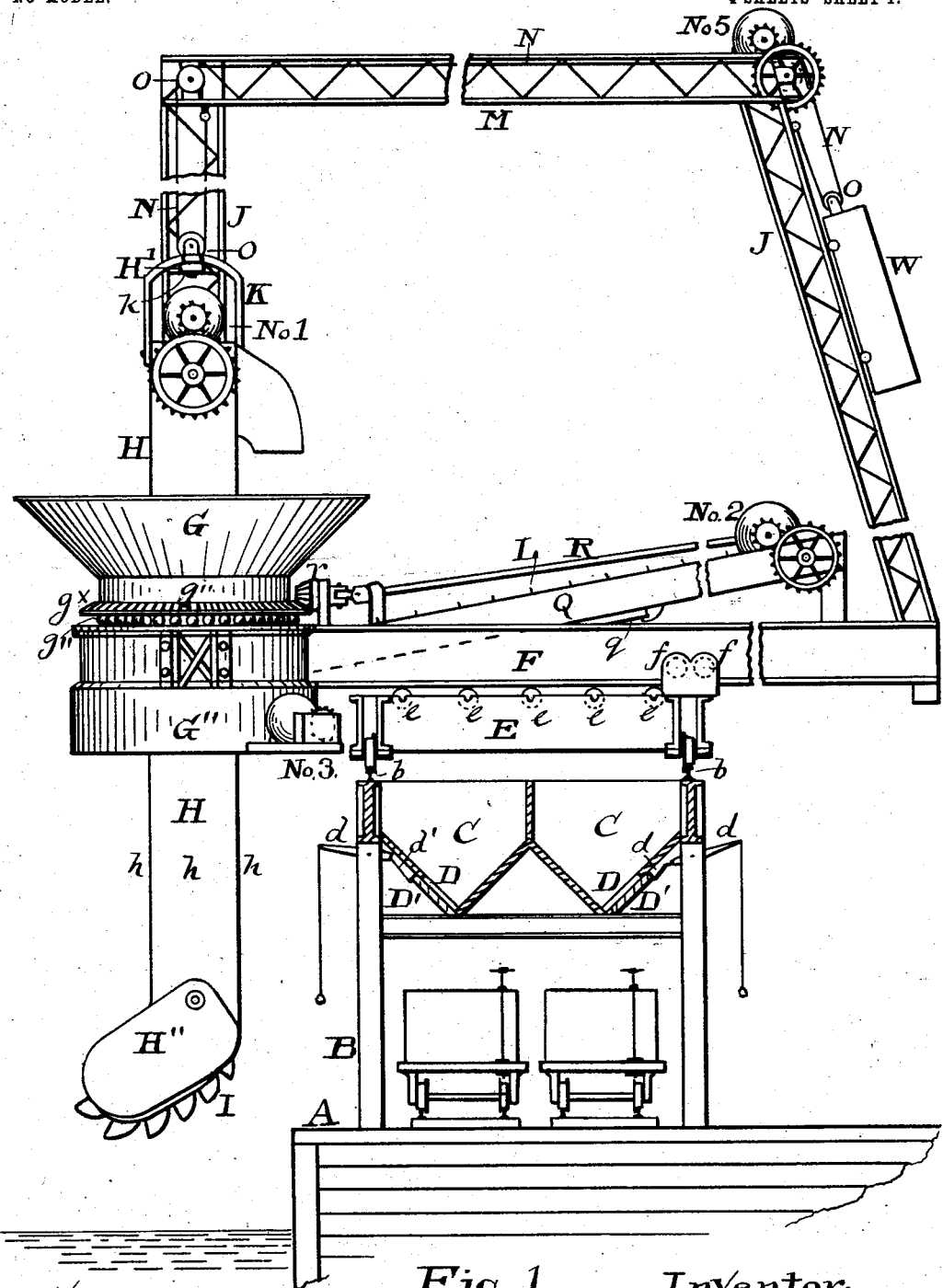
Figure 2:
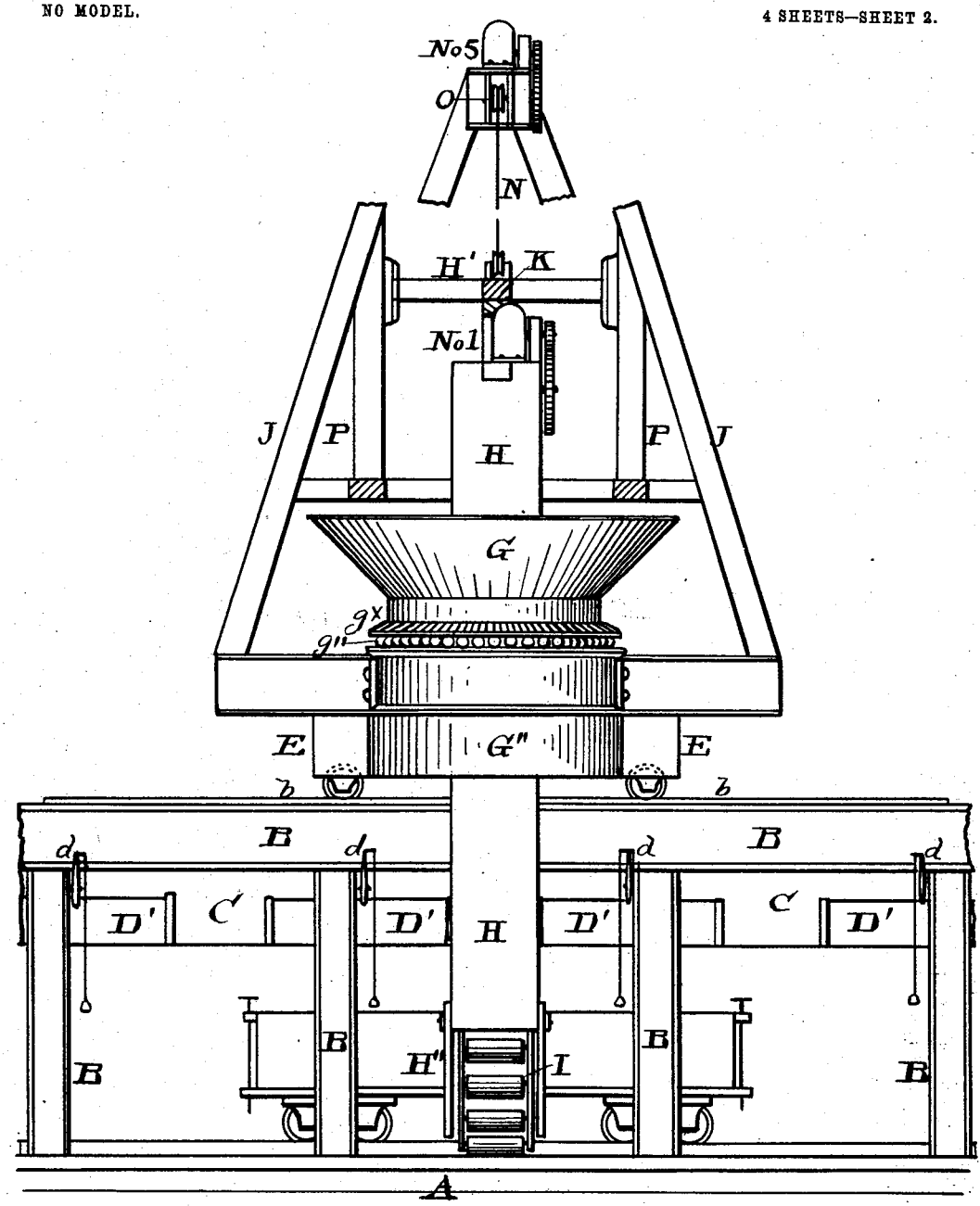
Figure 3:
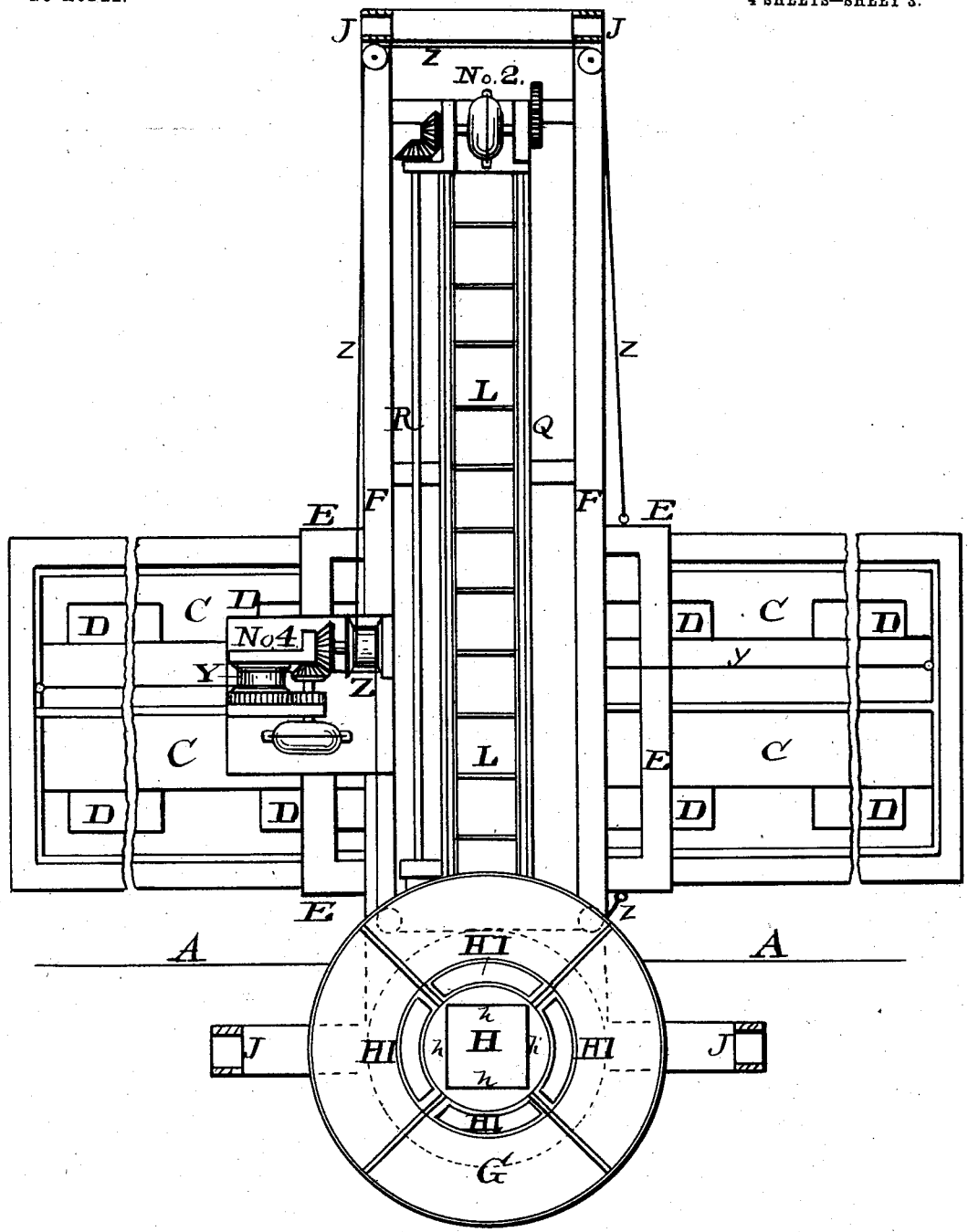
Figure 4:
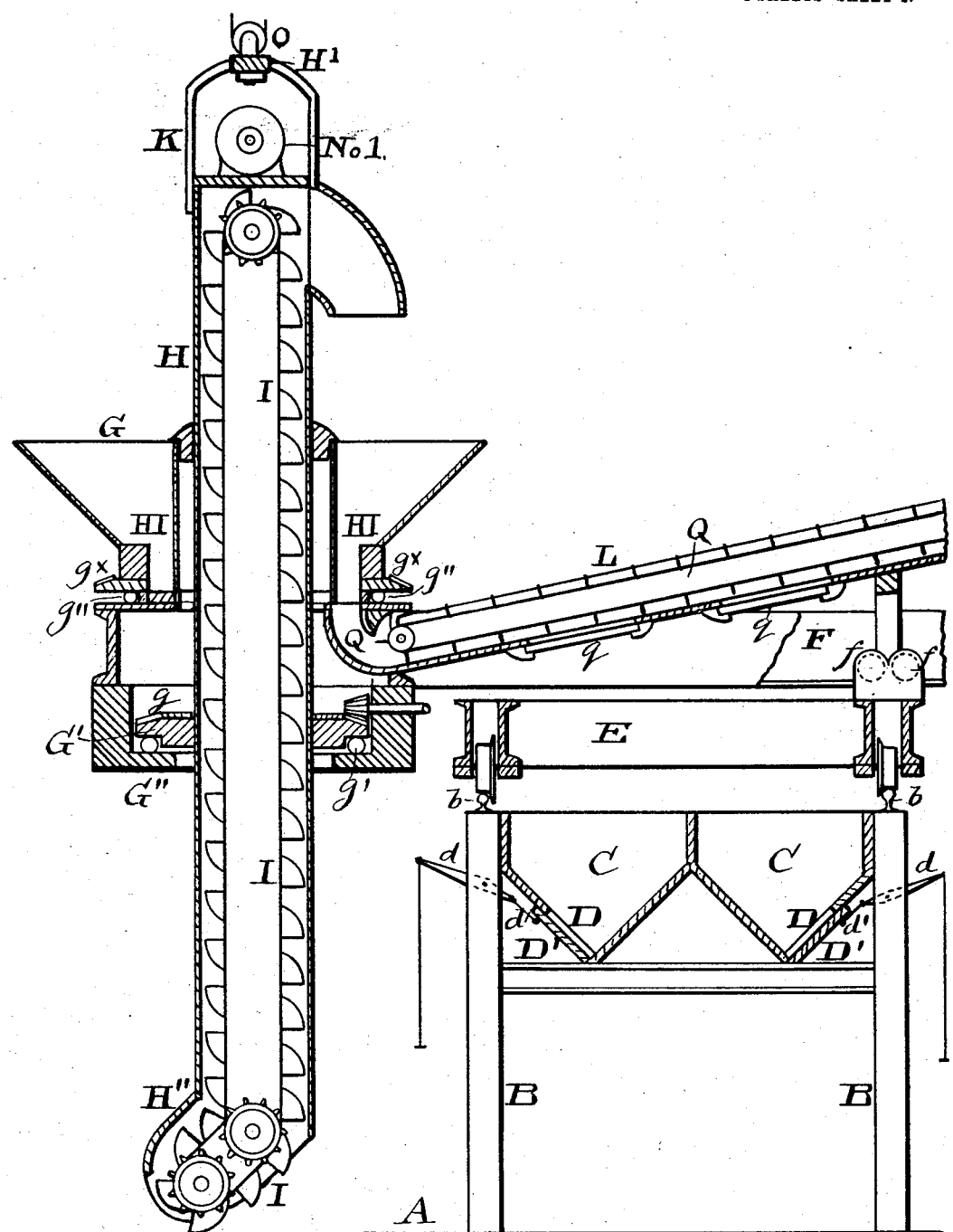

In the accompanying drawings, Sheet 1, Figure 1, is a side elevation, partly in section, of my new hoisting and conveying apparatus. Sheet 2, Fig. 2, is a front elevation of the apparatus. Sheet 3, Fig. 3, is a top or plan view of the apparatus with the upper framework removed. Sheet 4, Fig. 4, is a vertical sectional view of the hoisting and conveying part of the apparatus.

In Figs. 1 and 2, A represents a dock or wharf, by the side of which a vessel or boat is to be moored, from which the load is to be discharged.

B is a trestle-framework situated near the edge of the dock and of sufficient height for railway-cars to pass under. On the top of the trestle are provided track-rails $b\ b$, upon which the carriage which supports the elevating and conveying mechanisms can be traversed. Beneath the said track and sufficiently high above the dock for cars to pass under are provided large troughs or slanting-bottom bins C C for receiving the contents of the conveyer. On one side of the troughs are provided discharge-openings D D, having sliding doors D' D', which are operated by means of hand-levers $d\ d$, fulcrumed to the posts of the trestle A and connected by links $d'$ with the said doors D'.

E is a carriage-frame supported on the track-rails $b\ b$. F is an oblong carriage-frame supported and traversable on said carriage E transversely therewith.

$e\ e$ are rollers set in the side rails of carriage-frame E, upon which carriage F rests and rides.

$f\ f$ are rollers attached to the corners of carriage E and which roll on the lower flange of carriage F, designed for holding said carriage F down and prevent its tilting over by the weight on its opposite end whenever said carriage may be run out forward.

G is a rotatable hopper supported on the forward end of the carriage F, intended to receive the ore elevated and discharged from vertical elevator.

G' is a turn-table attached to the under side of the forward end of the carriage F, sitting in a circular bed G''.

$g$ is an annular row of rack-teeth on the periphery of the turn-table G'.

$g'$ represents ball-bearings in the bed G'', upon which the turn-table rides. The hopper G also rides on ball-bearings $g''$ and also has annular rack-teeth $g^\times$.

H is an elevating-conveyer consisting of a beam made of four plates $h\ h\ h'\ h'$, forming a hollow beam, in which a bucketed chain belt I is made to travel. The beam H passes through a square hole in the turn-table, by means of which it is made to rotate on its vertical axis when required.

At each end of the carriage F are placed posts J J, the two at each end meeting at the top and are joined by an overhead rail M. The elevator H is suspended by a cable N, passing over pulleys O O at the top corners of the frame J J M.

K is a pulley-frame attached to the top of beam H by a swivel-joint $k$, by means of which the elevator may have rotative motion on its axis without twisting the cable.

H' is a cross-head attached to the swiveled pulley-frame K and slides in the upright guides P P, fixed to the forward posts J J. This keeps the elevator-beam H steady in its upright position. On the opposite end of the cable is attached a counterbalance-weight W, for the purpose of equalizing the weight upon the carriage F.

To the lower end of beam H is provided an arm H'', in which the conveyer-buckets play, and is for the purpose of having the conveyer reach out around to the sides of the vessel, thus giving it a wide scope for take-up.

Q is a connecting-conveyer supported on the carriage F, consisting of a beam similar to beam H, and is provided with a traveling drag-belt L. It is designed for hauling the ore received from the hopper along over the troughs and dropping into them. The conveyer-beam Q has openings Q', provided with sliding doors $q$, adapted to be opened at such points as may be required for discharging the ore and letting it fall into the troughs, from whence it may be dropped into the cars below.

The motive power used for operating this apparatus is electricity. The several movements are operated independently by separate motors in the following manner: On the top of elevator-beam H is placed motor No. 1 for operating the hoisting-buckets. On the end of conveyer Q is placed motor No. 2 for operating the drag L. It is also connected by bevel-gear and a shaft R with the hopper G by a bevel-gear $r$, whereby both the drag and the hopper are operated simultaneously. The hopper is divided into compartments, in the bottoms of which are openings H', which register with the inner end of the conveyer Q, so that as the hopper rotates it will discharge its contents from the compartments in succession as they come over said conveyer. On the carriage F is placed motor No. 3, connected with the turn-table G' for operating the turning of the vertical elevator to have its arm H'' rotate in the hold of a vessel to reach a wide sweep. On the carriage F is also placed a motor No. 4, having drums Y Z, having ropes $y$ $z$, connecting them with the carriages E and F, used for shifting them in position relatively on the trestle. The drum Z is for moving the carriage F outward to bring the elevator H out over the hatchways of vessels. The drum Y is for moving the carriage E along on the trestle A to shift the elevator to other hatchways. On the top corner of the framework J J M is also placed a small motor No. 5, connected with cable N. This is employed for raising and lowering the elevator H. Wires from a suitable electric-current-supply source are to be connected with these motors and with a switchboard located in some convenient place on the trestle. One operator would be enabled to manipulate the entire apparatus with ease and despatch.

Having now described my invention, what I claim is—

1. In a hoisting and conveying apparatus, a vertical elevator, consisting of a hollow beam, a swiveled pulley on the top of said beam, and a pivoted extension on its lower end, a cable supporting said beam by suspension, said cable running over pulleys on the elevator-carriage frame, and having a counterbalance-weight; a bucketed elevator supported and operated in said beam, and a motor mounted on the beam for operating the elevator substantially as described.

2. In a hoisting and conveying apparatus, a vertical elevator, consisting of a hollow beam, a swiveled pulley on the top of said beam, and a pivoted extension on its lower end, a cable supporting said beam by suspension, said cable running over pulleys on the elevator-carriage frame, and having a counterbalance-weight, a bucketed elevator supported and operated in said beam, and a motor mounted on the beam for operating the elevator, a carriage and framework for supporting the elevator and its supporting-cable, a turn-table supported by said carriage and through which the elevator-beam passes, and a motor on the carriage for turning the turn-table, substantially as described.

3. In a hoisting and conveying apparatus, a trestle, trough-bins in the upper part of said trestle, and track-rails on the top of the trestle, a carriage mounted to run on said track-rails, a second carriage mounted on said first carriage, a vertical elevator mounted on said second carriage, a rotative hopper on said carriage through which the elevator passes, a conveyer connected with said hopper, and means for operating the elevator, hopper and conveyer, substantially as described.

4. In a hoisting and conveying apparatus, a trestle, troughs supported in said trestle, doors in the bottoms of said troughs, track-rails on the top of the trestle, a carriage mounted to run on said rails, a second carriage mounted on said first carriage, a turn-table on the second carriage, a rotative hopper on said turn-table, a vertical elevator passing through the hopper and turn-table, a framework on the second carriage, a swiveled pulley-frame and cross-head on the top of the elevator, a cable attached to the pulley-frame, pulleys on the top of the carriage-frame over which said cable passes, a conveyer mounted on the second carriage in connection with the hopper, and means connected, respectively, with the carriages, the turn-table, the hopper, the elevator, and the conveyer, for operating them, substantially as and for the purpose described.

Signed by me at Cleveland, Ohio, this 15th day of November, 1902.

TIMOTHY LONG.

Witnesses:
 GEO. W. TIBBITTS,
 EDWARD F. SPURNEY.